Jan. 3, 1950 G. R. INGELS 2,493,143
WELD ROD
Filed Aug. 28, 1948 2 Sheets-Sheet 1
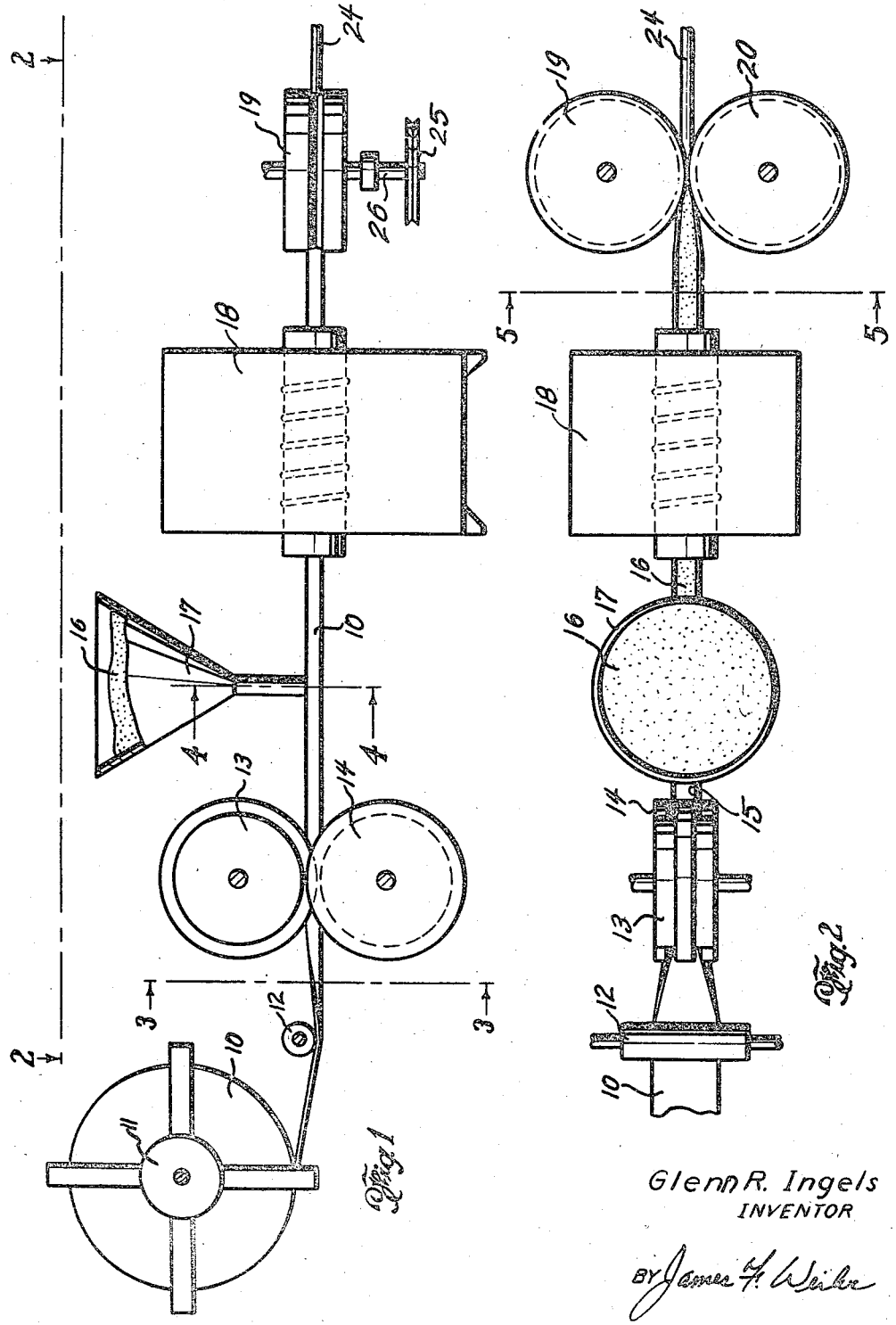
Glenn R. Ingels
INVENTOR
ATTORNEY Jan. 3, 1950   G. R. INGELS   2,493,143
WELD ROD
Filed Aug. 28, 1948   2 Sheets-Sheet 2
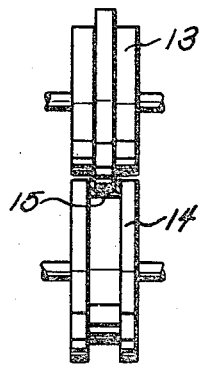
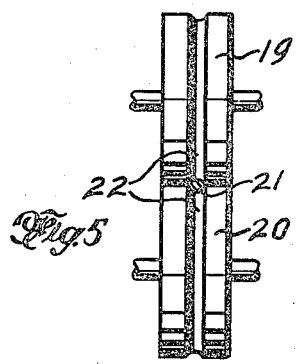
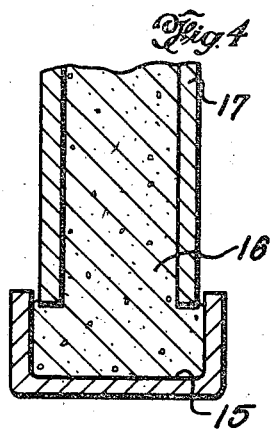
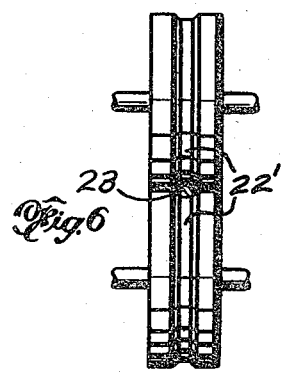
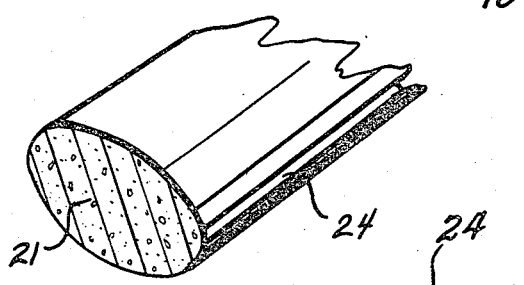
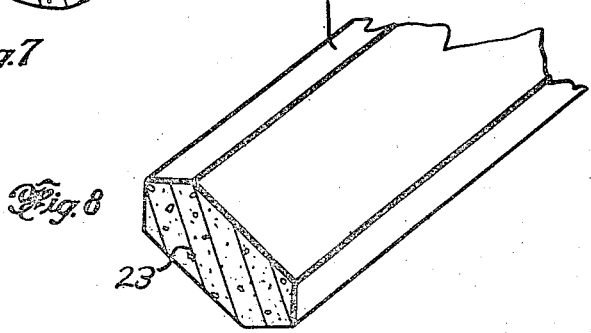
Glenn R. Ingels
INVENTOR
BY James F. Weiler
ATTORNEY Patented Jan. 3, 1950

2,493,143

UNITED STATES PATENT OFFICE 2,493,143

WELD ROD

Glenn R. Ingels, Houston, Tex.

Application August 28, 1948, Serial No. 46,605

7 Claims. (Cl. 219—8)

The present invention relates to a new and useful improvement in hard facing alloy welding rods and their manufacture.

At the present time, many parts which are subjected to heavy wear are "faced" with a material which will stand heavy abrasion. By "facing" it is meant that the wearing parts are coated by welding with a material which has high wearing resistance properties. Among a few of the materials which stand high wear are alloys of tungsten, cobalt and carbon. Many of these wear resistance alloys have high melting points. For instance, tungsten itself melts at temperatures around 6000° F.

In the art at the present time, hard metal alloy grains are mixed with lower melting point alloys which act as binders. During the welding process, this binder melts and flows over the metal surface to the "faced," binding the hard metal alloy grains to the wearing surface. The binder material usually melts around 2700° F. It can, therefore, be seen that the binder material and its distribution is an extremely important factor in the successful manufacture of a high quality hard facing alloy rod.

At present there are three known processes for manufacturing hard facing weld rods. The hard facing metal grains are packed in metal tubes and sealed, the tubes supplying the binder metal. The hard facing metal grains are mixed with a flux and the mixture is molded on the outside of a solid metal rod, which may have cavities therein, which acts as a binder. The hard facing metal grains may be mixed with a binder metal by melting the binder metal around the hard facing alloy grains and forming them into a rod.

The above processes have numerous disadvantages among which are that where the rods are made by packing the grains in the tubes, the rods do not flow freely during welding due to the lack of binder metal intimately surrounding each hard facing alloy grain; the rods made by mixing the hard metal grains with a flux and molding the mixture on a binder rod do not flow freely and large grains of hard facing metals cannot be molded successfully; and, while the rods made by melting a binder intimately with the hard facing grains flow better than either of the other two processes, the cost of manufacture is extremely high and the binder metal dissolves appreciable portions of the hard facing metal grains during the two meltings—the first during fabrication thereof and the second during application of the weld rod onto the surface to be faced.

A further disadvantage of the above methods is that welding rods made by such processes are round or approach roundness in cross sectional area. The apparent reason for this is the ease in the present manufacture of such a rod.

Accordingly, the present invention has for one of its important objects to provide, in a manner hereinafter set forth, a hard facing welding rod embodying a novel construction and arrangement whereby one of the axis of its cross section may be longer than the second axis.

Another very important object of the invention is to provide a hard facing alloy rod and apparatus and method of making the same wherein its cross section is so formed to provide free, wide and maximum coverage of surfaces to be hard faced during the welding process.

Another important feature of the invention is the provision of a hard facing alloy rod embodying a cross section in which the binder metal is forced or squeezed at elevated temperatures into the voids between the hard facing alloy grains thereby creating an easy flowing rod due to the intimate association of the binder metal with each grain of hard facing alloy.

It is a particular feature of the invention to provide a method of and apparatus for making an easy flowing welding rod wherein the grains of additive material are substantially evenly dispersed throughout the binder material and wherein such a rod may be produced at low cost.

Other objects of the invention are the provision of hard facing welding rods of the character described which will be simple in construction, strong, durable, highly efficient and reliable in use, attractive in appearance and which may be manufactured at low cost.

A further feature of the invention is to provide a means for and method of fabricating a weld rod at low cost wherein large grains of additive material may be evenly dispersed throughout the binder material.

The above and further objects and advantages of the invention will be apparent from the following description of a preferred embodiment of my welding rod, its method of and apparatus for manufacture, taken in connection with the accompanying drawing wherein like characters of reference designate like parts throughout the several views and wherein Figure 1 is a diagrammatic view of a side elevation illustrating a means for and manner of forming my welding rod, Figure 2 is a plan view taken along the line 2—2 of Figure 1 and illustrates a means for and the manner of forming my welding rod.

Figure 3 is taken along line 3—3 of Figure 1 and illustrates a pair of channel rollers, Figure 4 is a cross section taken along line 4—4 of Figure 1 and shows the manner of feeding additive material to the channeled binder material, Figure 5 is taken along line 5—5 of Figure 2 and shows the forging rollers, Figure 6 is similar to Figure 5 but shows a modification thereof and Figures 7 and 8 show the finished weld rod, Figure 7 being substantially oval or elliptical in cross section and Figure 8 being multi-sided but with one axis of the cross section of the rod longer than a second axis thereof.

Referring to the accompanying drawings, and in general to Figures 1 and 2, 10 illustrates a binder material, which may be any suitable binder material in the art and may be in the form of a tape as illustrated and wound on reel 11.

In order to aid in depositing additive material on the binder material or metallic tape 10, the latter may be formed into a convenient channel to receive the former. A centering roller 12 centers binder tape 10 as the latter is passed through cooperating channel rollers 13 and 14 respectively, thus forming the binder material into a substantially U-shaped channel 15 as illustrated in Figure 3. The operation of the channel rollers is obvious and the binder material need not be formed into a U, but any crimping of the sides is sufficient which aids in holding the additive material on the binder material. Obviously the peripheral configuration of these rollers may be varied considerably.

The additive material 16 may consist of grains of any type of hard facing alloy or material for the desired use and it may be deposited in the channel 15 of the binder material 10 by means of the hopper 17. Referring to Figure 4, the lower opening of the hopper may extend downwardly below the upper edges of the vertical sides of channel 15 so that gravity will feed a predetermined desired amount of additive material to the binder material.

It is desirable to heat the binder material to a temperature range where it may be easily worked into intimate contact or association with the grains of additive material in order that maximum free flowage of the finished weld rod is possible and, for this purpose, a conventional furnace or heating means diagrammatically shown as 18 is provided. Any type of heating means may be utilized and no more description thereof appears necessary. In general the binder material may be heated to temperatures where it may be readily worked and it is preferred to heat it to a state of plasticity so that it might be easily worked. Most binder materials melt at temperatures lower than those of the additive materials so that the grains of the latter will not soften during the heating stage. The desirability of this feature appears apparent in using weld rods for hard facing operations.

After heating, the binder and additive materials may be passed to cooperating forging rollers 19 and 20 which work or knead the binder material intimately into contact or association with the grains of additive material thereby forming a rod wherein the latter is substantially evenly dispersed throughout the former. In order to provide as much surface as possible to an object being faced, the forging rollers may be provided with peripheral channels 22 adapted to form a rod of oval or elliptical cross section 21, as illustrated in Figures 5 and 7.

By changing the shape of the peripheral channels 22 any desired cross sectional configuration may be obtained. In Figure 6, channels 22' are so formed to produce the multi-sided cross section 23 of the rod 24 illustrated in Figure 8. In both the above instances it is apparent that one axis of the cross section of the finished rod 24 may be made longer than a second axis thereof.

It is believed that the manner of forming rods such as illustrated generally as 24 is apparent from the above description. Binder material is unwound from reel 11 and formed into a channel 15 by channel wheels 13 and 14. Additive material 16 is deposited in channel 15 by means of a hopper 17, the binder and additive materials are heated to the desired temperature in furnace 18 and they are forged or worked into intimate contact by forging wheels 19 and 20. Motive power for moving the binder material during fabrication of the rod may be supplied by a motor and belt, not shown, to wheel 25 connected to one of the rollers 20 by shaft 26. The finished rod 24 may be permitted to cool and cut into convenient lengths for use.

Many changes may be made within the scope of the invention. For example, while one set of rollers is shown in the forging step, several sets may be used to work the binder material into intimate association with the grains of additive material thereby evenly dispersing the latter throughout the former, and while the additive material is shown as being deposited in the channel prior to heating, such may be added after heating if desired.

Broadly my invention comprises the product resulting from and a means for and a method of forming an easy flowing welding rod by heating the binder material and working the same into intimate association with grains of additive material. It will be understood that various changes may be made therein without departing from the spirit or scope of the invention as defined by the appended claims.

I claim:

1. The method of making easy flowing welding rods comprising depositing a material desirable in welding upon a binder material and forging said binder material intimately in between the grains of said other material.

2. The method of making easy flowing welding rods comprising forming a channel in a binder material, depositing a material desirable in welding in said channel and forging said binder material intimately in between the grains of said other material.

3. The method of making easy flowing welding rods comprising forming a channel in a binder material, depositing grains of hard facing alloys in said channel, heating said binder material to a state of substantial ductility and compressing the ductile binder material into the voids between said grains of hard facing alloy.

4. The method of making easy flowing welding rods comprising forming a channel in a metallic tape, feeding hard facing alloy grains into said channel, heating said metallic tape to a substantially plastic condition and kneading said metallic tape while in said plastic condition between the grains of said hard facing alloy.

5. The method of making easy flowing welding rods comprising depositing grains of hard facing alloy on a binder material, heating said binder material to a temperature lower than its melting point and working said binder material into intimate contact with said grains of hard facing alloy.

6. The method of making easy flowing welding rods comprising forming a channel in a binder tape, depositing grains of hard facing alloy in said channel, heating said tape above cold working temperature and squeezing said tape into intimate contact with said grains of hard facing alloy while heated above said cold working temperature.

7. The method of making easy flowing weld rods comprising heating a binder material to a binder to a state of substantial plasticity and working said binder material while in said state of substantial plasticity into intimate association with an additive material.

GLENN R. INGELS.

REFERENCES CITED

The following references are of record in the file of this patent:

UNITED STATES PATENTS

| Number | Name | Date |
| --- | --- | --- |
| 1,629,748 | Stoody | May 24, 1927 |
| 1,852,847 | Harrington | Apr. 5, 1932 |
| 2,002,198 | Wissler | May 21, 1935 |
| 2,002,462 | Woods | May 21, 1935 |
| 2,350,387 | Cito | June 6, 1944 |

Certificate of Correction

Patent No. 2,493,143 January 3, 1950

GLENN R. INGELS

It is hereby certified that errors appear in the printed specification of the above numbered patent requiring correction as follows:

Column 1, line 19, for the words "to the" read *to be*; column 5, line 13, strike out "binder to a";

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*